United States Patent
Fischer et al.

(10) Patent No.: US 6,275,581 B1
(45) Date of Patent: Aug. 14, 2001

(54) EXTENDED FEEDBACK CIRCUIT EMPLOYING CAPACITIVE COUPLING AND SAMPLED DATA FILTERS

(75) Inventors: Jonathon Herman Fischer, Blandon; Donald Raymond Laturell, Allentown; Keith Eugene Hollenbach, Reading; Steven Brooke Witmer, Sinking Springs, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/037,404

(22) Filed: Mar. 10, 1998

(51) Int. Cl.[7] .............................. H04M 1/76; H04M 3/02; H04M 11/00
(52) U.S. Cl. ..................... 379/398; 379/394; 379/93.06
(58) Field of Search .................... 379/394, 398–405, 379/412, 377, 93.05, 93.06, 93.28, 93.35–93.37

(56) References Cited

U.S. PATENT DOCUMENTS

| | | | |
|---|---|---|---|
| 4,270,027 | * | 5/1981 | Agrawal et al. ................. 379/377 |
| 5,500,895 | * | 3/1996 | Yurgelites ........................ 379/377 |
| 5,655,010 | * | 8/1997 | Bingel ............................. 379/412 |
| 5,870,046 | * | 2/1999 | Scott et al. ....................... 379/412 |
| 5,875,235 | * | 2/1999 | Mohajeri .......................... 379/93.05 |

OTHER PUBLICATIONS

European Telecommunications Standards Institute, Terminal Equipment (TE); Attachment requirements for pan–European approval for connection to the analogue Public Switched Telephone Networks (PSTNs) of TE (excluding TE supporting the voice telephony services) in which network addressing, if provided, is by means of Dual Tone Multi Frequency (DTMF) signaling, Jun. 1996.

* cited by examiner

Primary Examiner—Wing F. Chan
(74) Attorney, Agent, or Firm—Synnestvedt & Lechner LLP

(57) ABSTRACT

A network interface circuit employing differentially driven capacitive couplings across a high voltage isolation boundary and in which a $\Sigma/\Delta$ CODEC is positioned on the line side of the high voltage interface. In this manner, only four wires cross the high voltage boundary, namely differential pairs for transmit data and receive data. The transfer functions for setting AC and DC parameters, such as impedance matching, are provided by digital filters. Further, with the CODEC on the line side of the high voltage isolation interface, the data which crosses the interface is modulated at the $\Sigma/\Delta$ data rate and, thus, capacitive coupling can be used across the high voltage isolation boundary without the loss of DC data.

31 Claims, 5 Drawing Sheets

EXTENDED FEEDBACK CIRCUIT EMPLOYING CAPACITIVE COUPLING AND SAMPLED DATA FILTERS

FIELD OF THE INVENTION

The invention pertains to a network interface circuit. More particularly, the invention pertains to a network interface circuit which uses capacitive coupling for voltage isolation between a low voltage side and a line side of a telephone network and an extended feedback loop for impedance matching.

BACKGROUND OF THE INVENTION

Telephone network interface circuits, i.e., data access arrangements (DAAs), for international applications require high voltage isolation and compliance with various country-specific parameters. The technical specifications for network interfaces include, among other things, (1) voltage isolation specifications between the low voltage side (the customer equipment side) and the network, (2) specific on-hook impedance requirements, (3) balancing of the line, referred to as impedance matching, (4) time delay requirements with respect to signals, and (5) absence of data on certain prescribed signalling frequencies.

High voltage isolation is necessary because customer equipment can place hazardously high voltages and currents on telephone lines which can damage central office equipment or even injure personnel. Further, data signal amplitudes must be maintained below certain maximum levels in order to avoid overloading the network and causing excessive cross-talk. On-hook impedance requirements also are specified because the central office must evaluate line conditions based on the difference between on-hook and off-hook impedance and also because the on-hook impedance must be sufficiently large so that the central office can drive the telephone ringer without requiring excessive power. Impedance matching is needed to control hum, cross-talk, and signal reflection at interfaces. Finally, time delay specifications and reserved signalling frequencies are established for billing protection for local telephone operating companies. These technical specifications and others for network connections vary widely from country to country.

For economic reasons, among others, it is desirable to design telephone network equipment that can, with minor adaptations, be used to meet the specifications of different countries.

FIG. 1 depicts a prior art circuit 100 for interfacing end user terminal equipment to a telephone network. The load impedance $Z_L$ represents the specific impedance parameters of the telephone network. High voltage isolated switches 101, 102, and 103 are connected across the interface and are programmed in combination with a transmission impedance $Z_S$ to provide the required impedance match to $Z_L$. One disadvantage of circuit 100 in connection with use in international markets is the need for a parallel array of a large number of high voltage isolated switches to generate a reasonable image match, i.e., impedance matching, between a user side and a line side of the network, to meet the different specifications of various countries, such as return loss requirements. These high voltage isolated switches are expensive, and, if present in sufficient numbers, will make a network interface circuit too large and costly to be practical where cost, size and programmability are paramount concerns. Accordingly, there is a need for a simplified network interface that eliminates the large number of high voltage isolated switches required for programming the network's specific parameters in accordance with the prior art as depicted in FIG. 1.

FIG. 2 illustrates another prior art circuit 200 which is intended to produce an output impedance $Z_O$ to match a line side impedance $Z_N$ of a network. Circuit 200 includes a transmit path having an operational amplifier circuit $A_{201}$, and a feedback path that includes an operational amplifier circuit $A_{202}$ and an emulation impedance $Z_{EM}$. The operational amplifier circuit $A_{201}$, provides a gain for a voltage signal applied from signal source 210. Using standard circuit analysis techniques, $Z_O$ of circuit 200 is defined as:

$$Z_o = \frac{(R_{205} + Z_{EM})R_{SENSE}}{(K+1)R_{205} + Z_{EM}},$$

$$\text{Where } K = \left(1 + \frac{R_{201}}{R_{202}}\right)\left(\frac{R_{204}}{R_{203}}\right)$$

A proper selection of $Z_{EM}$ in circuit 200 is intended to set $Z_O$ to match the impedance $Z_N$. However, as one skilled in the art will realize from equation 1, $Z_{EM}$ is not easily separable from the other scaling terms, i.e., the other circuit elements, such as resistors, which scale $Z_{EM}$. More specifically, $Z_O$ cannot be isolated into an impedance term and a separately distinguishable scale term. As such, circuit 200 suffers the disadvantage of having poor control of the output impedance $Z_O$ because $Z_{EM}$ cannot be effectively scaled in a practical manner. Thus, while circuit 200 is intended to provide an impedance match to $Z_N$, this objective is frustrated by the difficulty in scaling $Z_{EM}$ to set $Z_O$. Moreover, circuit 200 also suffers the disadvantage of not having voltage isolation between the line side and the low voltage side to protect against hazardous voltages and currents. Accordingly, circuit 200 does not provide a practical solution for impedance emulation across a high voltage boundary.

Although other efforts have been made to address impedance emulation in a network interface context using amplifier based circuits, these efforts have not been successful for several reasons. Among these reasons is that the prior art circuit topologies have not solved the noise problems associated with frequency related amplifier effects.

Accordingly, it is an object of the present invention to provide a simplified and less costly network interface that provides both impedance matching and voltage isolation between the line side and low voltage side of a network without using expensive high voltage isolation switches and the like.

It is another object of the present invention to provide a network interface circuit that utilizes capacitive coupling across the high voltage isolation boundary.

It is a further object of the present invention to provide a network interface circuit in which the CODEC is provided on the line side of the high voltage isolation interface.

It is yet a further object of the present invention to provide a network interface circuit in which impedance matching is provided by an extended feedback loop comprised of digital filter circuits.

SUMMARY OF THE INVENTION

In accordance with the present invention, a high voltage isolation network interface circuit is provided in which the CODEC is positioned on the line side of the high voltage isolation interface. The coding and decoding is performed by means of $\Sigma/\Delta$ analog-to-digital conversion and digital-to-analog conversion. In this manner, the high voltage interface can be provided by differentially driven capacitors. Further, the differential driver and differential receiver on the line side of the capacitors are digital as are all filters on the low voltage side of the capacitive interface.

The use of digital filters to provide the necessary transfer functions for setting the various AC and DC country-specific parameters allows for a wider range of operation and easier adaptation to meet various specifications since the transfer functions of the digital filters can be controlled and altered by reprogramming the filter coefficients.

Several advantages flow from the positioning of the $\Sigma/\Delta$ converters on the line side of the interface rather than on the low voltage side. First, only three interface line pairs are needed since the $\Sigma/\Delta$ data stream is one bit wide. one differential line pair is needed in the transmit direction to carry data. One differential line pair is used in the receive direction to carry data. The clock signal can be included with the data on this differential pair or, alternately, may be carried on a separate path. In the latter situation, there would be a third pair of differential capacitors and related circuitry. Accordingly, the number of high voltage interfaces is minimized. Further, by using $\Sigma/\Delta$ modulated signals across the capacitive voltage boundary, the data is essentially modulated at the oversample rate of the $\Sigma/\Delta$ modulator, rather than in the base band. Thus, capacitive coupling across the high voltage boundary can be used without the loss of DC data.

In a preferred embodiment of the invention, an extended feedback loop from the transmit path to the receive path is employed in order to emulate the required AC and DC parameters for impedance matching between the low voltage side and the line side of the network. The transfer functions for performing the emulation are performed by digital filter circuits.

DETAILED DESCRIPTION OF THE INVENTION

Figure 1:
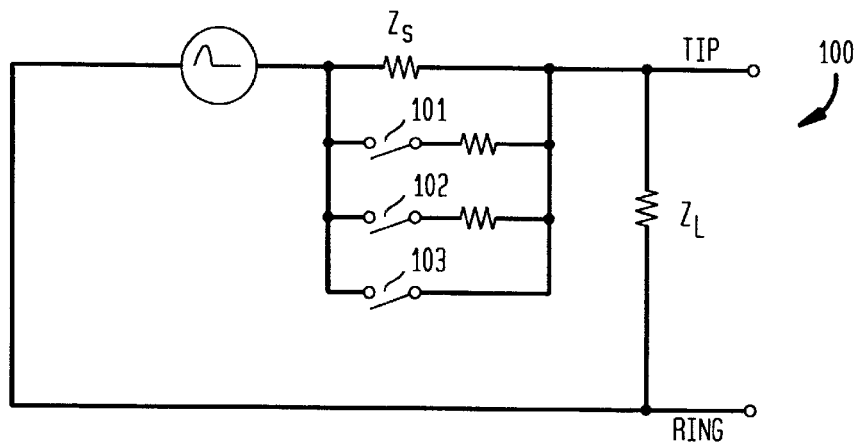
FIG. 1 is a schematic diagram of a prior art network interface circuit employing high voltage switches to provide impedance matching.
Figure 2:
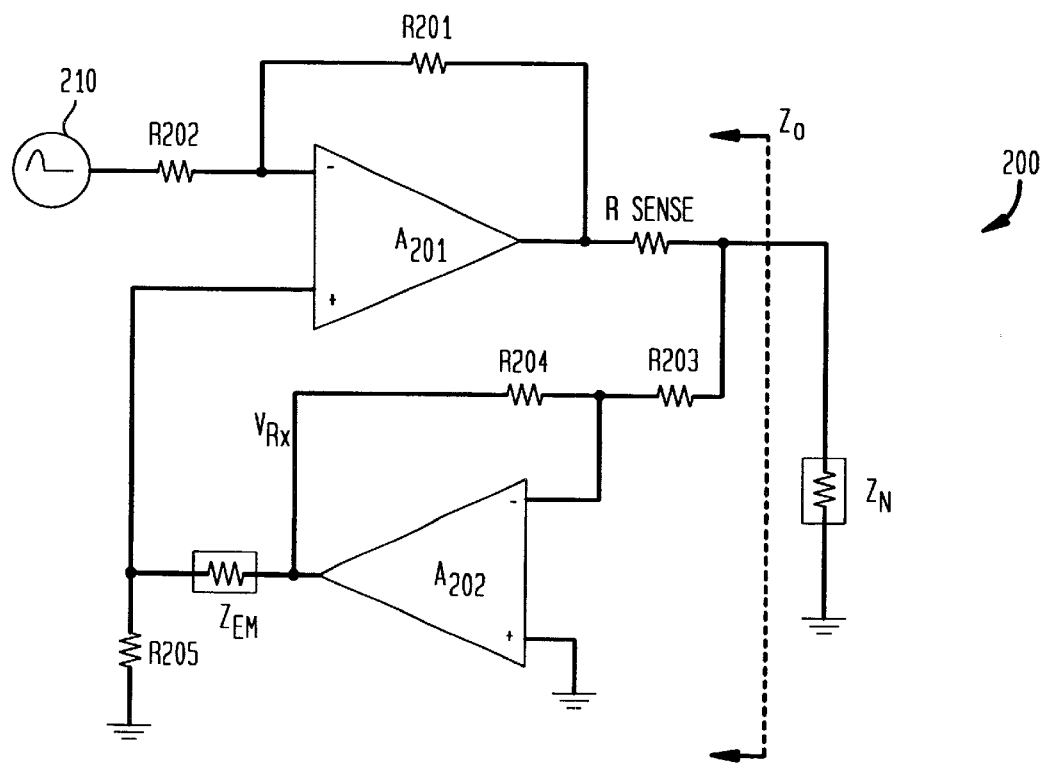
FIG. 2 is a schematic diagram of a prior art operational amplifier based network interface circuit for matching impedance.
Figure 3:
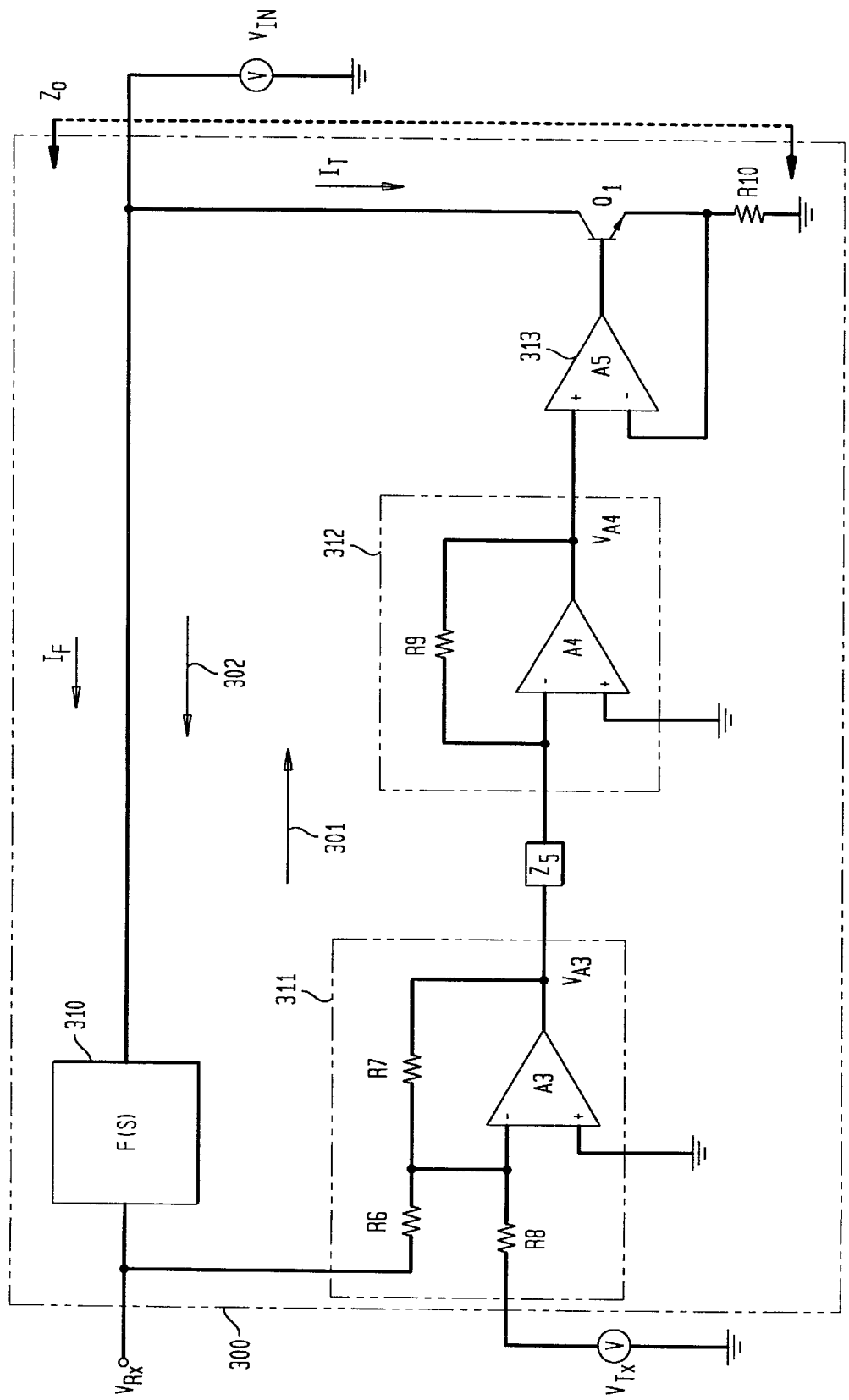
FIG. 3 is a circuit diagram of a network interface circuit in accordance with the present invention with an extended feedback loop to provide impedance matching across a high voltage boundary.

FIG. 3 is a schematic diagram of an impedance matching and voltage isolation circuit 300 between a low voltage side and a line side of a telephone network employing an extended feedback circuit loop for impedance matching. The circuit of FIG. 3 is described in detail in U.S. patent application Ser. No. 08/847,827, entitled "Extended Feedback Circuit for Impedance Matching and Voltage Isolation", filed Apr. 28, 1997, and which is incorporated herein by reference. The circuit uses an extended feedback loop to emulate a required AC and DC parameter for impedance matching between the low voltage side equipment (to the left of circuit 300 in FIG. 3) and the line side (to the right of circuit 300 in FIG. 3) of a network, particularly a telephone network. According to the exemplary embodiment illustrated in FIG. 3, the network interface circuit includes a transmit path having first, second and third amplifier elements 311, 312 and 313, an impedance element $Z_5$ and a receive path that includes a transfer function 310 forming an extended feedback loop for correcting amplifier gain and phase effects.

In this circuit arrangement, the output impedance is set by the impedance element $Z_5$ multiplied by a clearly delineated scale factor. As such, the output impedance can be effectively controlled to match the network impedance by properly scaling the emulation impedance. Moreover, the transfer function 310 corrects for noise problems associated with amplifier gain and phase effects by attenuating the signal and/or correcting for excess phase shift. For greater detail, reference should be made to aforementioned U.S. patent application Ser. No. 08/847,827.

Figure 4:
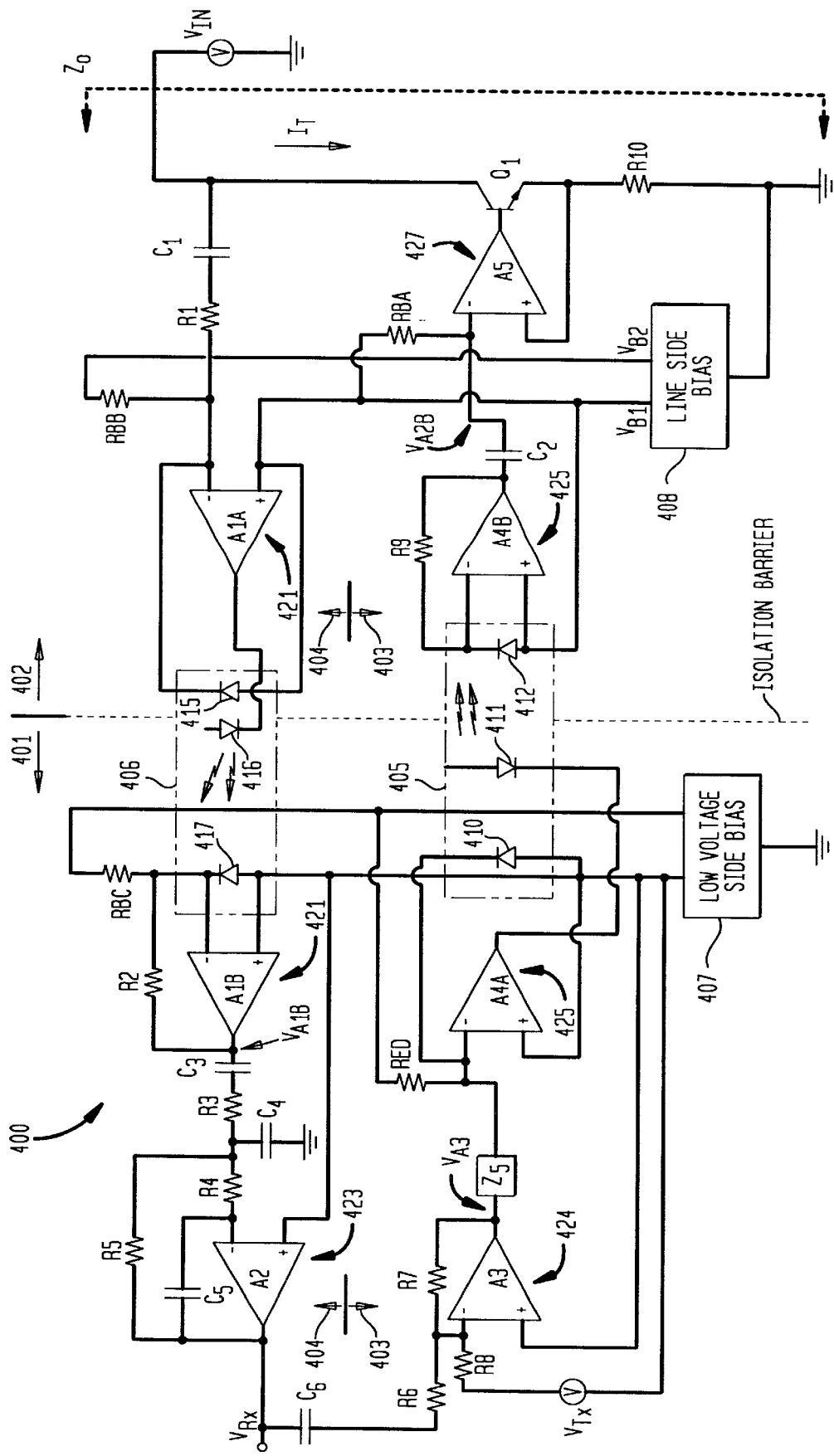
FIG. 4 is a circuit diagram illustrating a practical implementation of the network interface circuit shown in FIG. 3.

FIG. 4 herein is a circuit diagram illustrating a particular practical embodiment of the circuit shown in FIG. 3. Although not shown in FIGS. 3 and 4, a CODEC (coder/decoder) converts the receive path 404 data from analog to digital and the transmit path 403 data from digital to analog at a point to the left of the circuitry shown in FIGS. 3 and 4 (further out on the user, low-voltage, side of the circuit). Accordingly, the data passing through the voltage isolation and impedance matching circuit of FIGS. 3 and 4 is in analog (continuous time) form.

Voltage isolation between the line side 402 and the low-voltage user side 401 is provided by linear optical coupler (LOC) circuits 405 (in the transmit direction) and 406 (in the receive direction). The LOCs 405 and 406 provide voltage isolation between the low voltage side and the line side and inherently provide common mode rejection. Amplifier circuits 424, 425 and 427 in the transmit path perform appropriate signal conditioning and provide gain to the transmit signals. A variable current device Q1 responsive to the transmit signal at the output of amplifier circuit 427 is part of an extended feedback loop that matches the network impedance across the high voltage boundary. Particularly, Q1 may be a bipolar transistor having a base, a collector, and an emitter, with the base coupled to the output terminal of amplifier circuit 427, the emitter coupled to the inverting input terminal of amplifier A5 in amplifier circuit 427 and through resistor R10 to ground, and the collector coupled to the receive path 404.

The receive path 404 includes a first amplifier circuit 421 comprising a single extended operational amplifier having a first segment $A_{1A}$ operating on the line side portion 402 and a second segment $A_{1B}$ operating on the low-voltage side portion 401 of the circuit. A second amplifier circuit 423 provides the transfer function F(s). Amplifier 423 is a second order low pass filter. Transfer function F(s) is calibrated to remove the high frequency signals present in the feedback loop extending from the variable current device Q1 through the receive path 404.

The extended feedback loop from the transmit path to the receive path through the variable current device Q1 carries the transmit data to filter circuit 423 which performs the transfer function F(s) to remove the high frequency signals that are generated through the complex feedback loop. The output of the amplifier circuit 423 is receive voltage signal $V_{RX}$, which is coupled through capacitor $C_6$ back into the transmit path at one input of the first amplifier circuit 424 to complete the feedback loop.

Reference should be made to aforementioned U.S. patent application Ser. No. 08/847,827 for a more detailed description of the circuits of FIGS. 3 and 4 herein. The reference numerals in that application correspond to the reference numerals herein.

Figure 5:
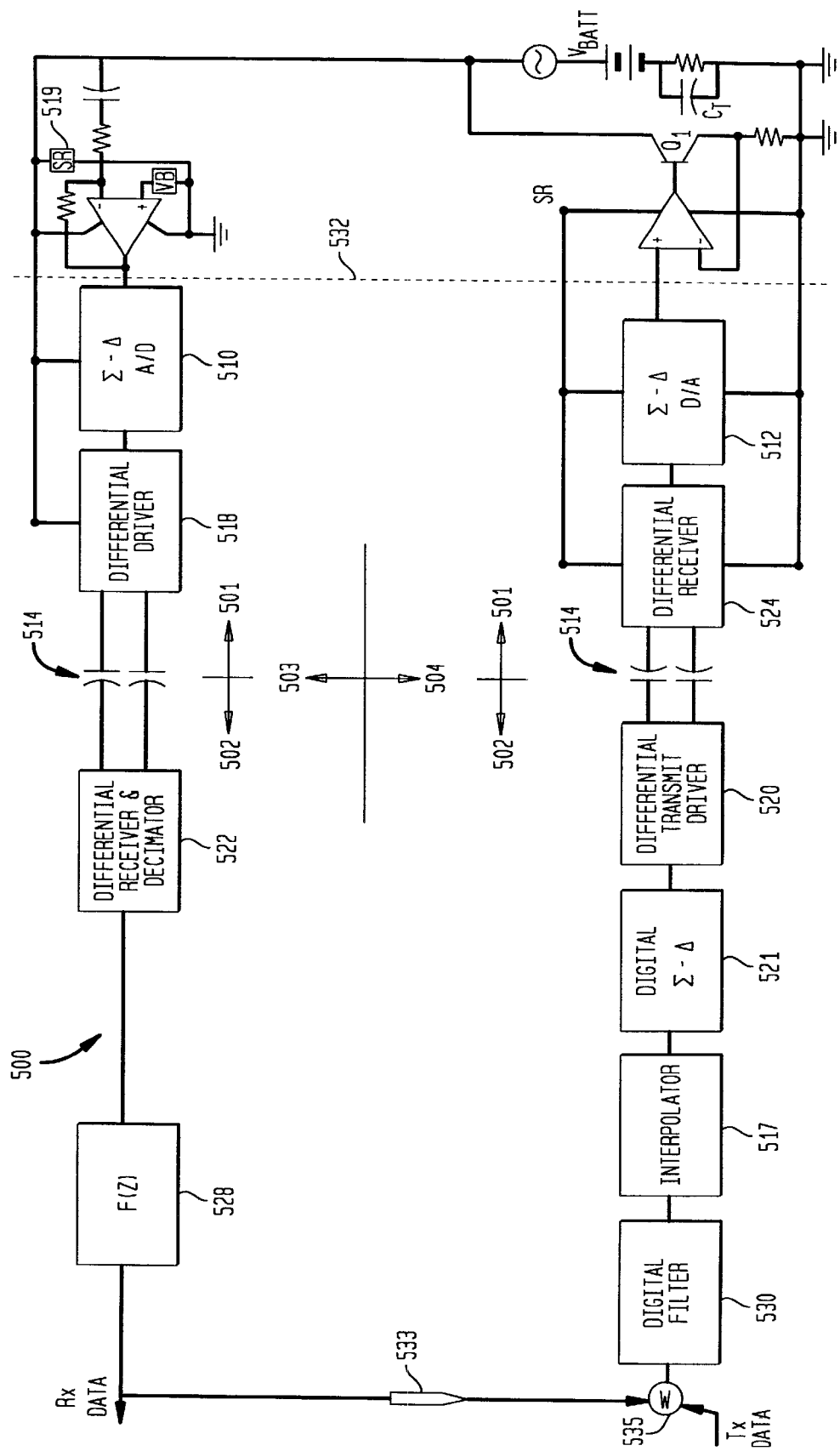
FIG. 5 is a circuit diagram of a network interface circuit in accordance with the present invention utilizing an extended feedback loop for impedance matching and capacitive coupling across the high voltage isolation boundary.

FIG. 5 shows an interface circuit 500 in accordance with a preferred embodiment of the present invention.

In the invention, the CODEC functions are performed on the line side 501 of the high voltage interface. In a preferred embodiment of the invention, the CODEC is a $\Sigma/\Delta$ CODEC comprising a $\Sigma/\Delta$ analog-to-digital converter 510 in the receive path 503 and a $\Sigma/\Delta$ digital-to-analog converter 512 in the transmit path 504.

The shifting of the $\Sigma/\Delta$ modulation and demodulation to the line side of the circuit provides several advantages. First, the high voltage interface can be achieved by capacitive coupling circuits 514 and 516 rather than LOCs. In order to provide common mode rejection, the high voltage isolation interfaces 514 and 516 are differentially driven by differential drivers 518 and 520, respectively. Accordingly, differential receivers 522 and 524 are positioned on the opposite side of the capacitive interfaces 514 and 516 from differential drivers 518 and 520, respectively.

Capacitive coupling is preferable to optical coupling across the high voltage isolation boundary due to the extremely low cost of the capacitive elements used in the interface circuit relative to the cost of linear optical coupler circuits. For instance, whereas linear optical couplers cost approximately $1.00 a piece, the cost of the capacitive couplers is almost negligible, i.e., a few cents each. Further, the use of a single bit wide $\Sigma/\Delta$ modulation means that only a single pair of capacitors in each direction is needed to pass the data across the high voltage isolation boundary.

Even further, with the $\Sigma/\Delta$ modulation CODEC functions on the line side 501 of the circuit, the gain adjustment and filtering on the low voltage side 502 can be accomplished in the digital domain with digital (discrete time) filters. Accordingly, transfer function F(s) in FIG. 3 is replaced with digital transfer function F(z) 528 shown in FIG. 5. The receive path is coupled back into the transmit path through a scaling block 533 to be digitally summed with the transmit data as shown at 535. The analog (continuous time) filters 311, 312 and 313 in FIG. 3 are replaced with digital gain adjust and filter circuit 530, which digitally provides the desired gain adjustment, filtering and impedance emulation. The combined signal is interpolated by digital interpolator circuit 517 and converted to $\Sigma/\Delta$ data by circuit 521. The converted data is forwarded to differential driver 520. The 1-bit output is then forwarded through the capacitive high voltage interface 516 to the differential receiver 524. The $\Sigma/\Delta$ digital-to-analog converter 512 accepts the 1-bit data stream output by the differential receiver and converts it to analog form.

In FIG. 5, the circuitry to the right of dashed line 532 is analog circuitry that is essentially identical to that of FIGS. 3 and 4, except for the addition of shunt regulator 519.

In order to capacitively couple across the high voltage boundary, the DC component of the data signals must be preserved (or restored). By performing $\Sigma/\Delta$ coding and decoding on the line side of the interface, the data crossing the capacitively coupled interface is $\Sigma/\Delta$ modulated data.

That is, the transmit and receive data signals are essentially modulated by the $\Sigma/\Delta$ sampling clock and, thus, can cross the capacitive boundary without loss of DC data. Without the modulation, DC data would be blocked by the capacitively coupled isolation barriers 514 and 516.

Figure 6:
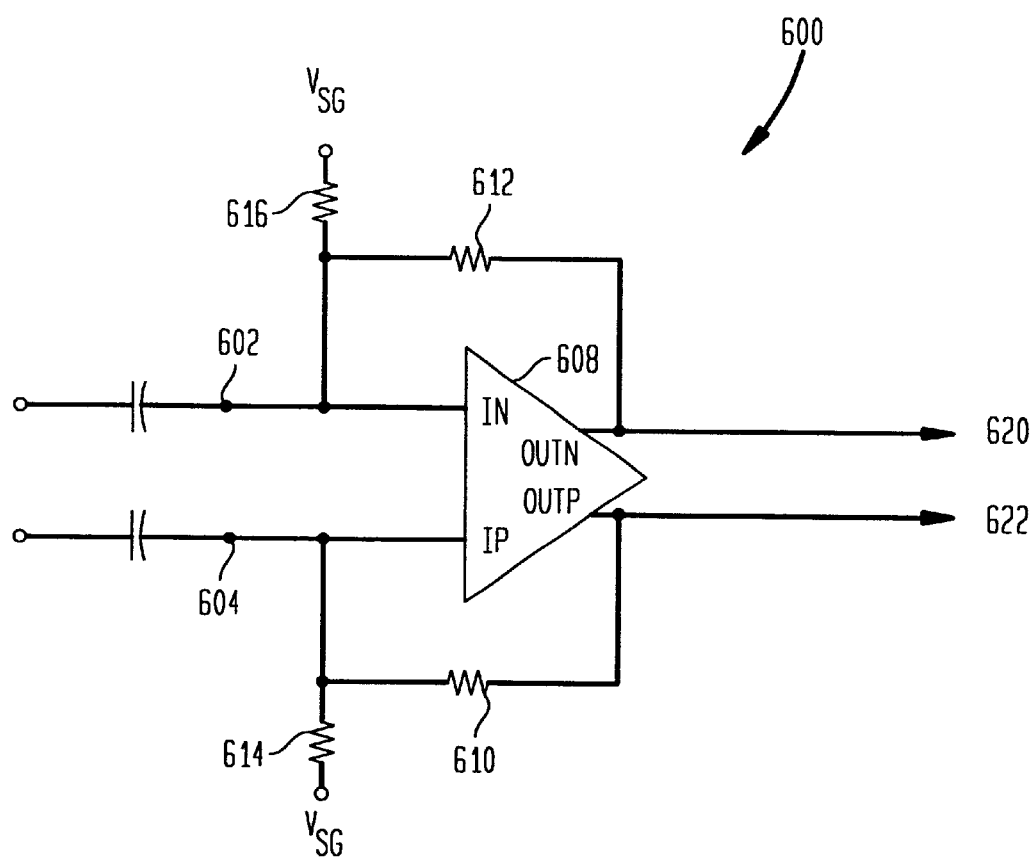
FIG. 6 is a circuit diagram of an exemplary differential receiver which can be used for the differential receivers shown in FIG. 5.

FIG. 6 is a high level circuit diagram of an exemplary differential receiver circuit 600 which can be used for differential receivers 524 and/or 522 in FIG. 5. The differential signal is received across the capacitively coupled boundary at terminals 602 and 604. Circuit 600 comprises operational amplifier 608 and resistors 610, 612, 614 and 616.

Circuit 600 has hysteresis to recover the 1-bit $\Sigma/\Delta$ pattern in the presence of input wave form DC (average value) shifts that are a function of the bit pattern. This effect is known in the art as baseline wander. The differential output is taken at terminals 620 and 622 of operational amplifier 608. $V_{sg}$ is set at ½ the power supply voltage of the circuit.

In accordance with the embodiment of FIG. 5, essentially no analog circuitry remains on the low voltage side of the interface circuit. The use of digital filters provides convenient control of the transfer functions simply by the programming of digital filter coefficients (e.g., via a digital signal processor) and provides a greater range of operation than analog filters. Thus, a single interface circuit can be adapted for use in different countries with different requirements simply by reprogramming the digital filter coefficients. The digital filters may be constructed of dedicated hardware with only the coefficients being programmable. Alternately, the digital filters may be implemented in a digital signal processor.

Although the invention has been described herein with respect to an interface circuit between a low voltage side and a line side of a telephone network, it should be understood that the invention has much broader application and can be used in connection with other voltage isolation boundary crossing circuits.

For instance, the use of an extended feedback loop and capacitive coupling across a high voltage isolation boundary in accordance with the present invention also can be applied to the interface circuit disclosed in U.S. patent application Ser. No. 08/866,510 entitled Interface Devices Providing Electrical Isolation filed May 30, 1997, incorporated herein by reference. Even further, although the present invention is particularly well-suited for use as an interface between user terminal equipment and a switched telephone network, the circuit topology disclosed herein can be applied to other interface situations requiring isolation and impedance matching between the end user terminal equipment and the interconnected network.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A network interface circuit for providing voltage isolation and impedance matching between a network and equipment coupled to said network through said network interface circuit comprising:

a receive data path coupling data from said network to said equipment;

a transmit data path coupling data from said equipment to said network;

a first CODEC coupled to said network in said receive data path;

a first capacitive coupler coupled in said receive data path between said CODEC and said equipment;

a second CODEC coupled to said network in said transmit data path;

a second capacitive coupler coupled in said transmit data path between said CODEC and said equipment;

a digital transfer function circuit coupled between said first capacitive coupler and said equipment;

a digital summing circuit in said transmit data path coupled to add an output from said digital transfer function circuit to a transmit signal; and an extended feedback circuit coupled between said digital summing circuit and said digital transfer function circuit.

2. A network interface circuit as set forth in claim 1 wherein said first CODEC is a $\Sigma/\Delta$ analog-to-digital converter and said second CODEC is a $\Sigma/\Delta$ digital-to-analog converter.

3. A network interface circuit as set forth in claim 1 wherein a gain of said digital feedback circuit is scalable to set an output impedance substantially matching a load impedance of said network.

4. A network interface circuit as set forth in claim 3 wherein said extended feedback path further comprises a transistor coupled between said transmit path and said receive path on a network side of said network interface circuit.

5. A network interface circuit as set forth in claim 4 wherein said extended feedback circuit further comprises a digital gain adjust circuit coupled in said transmit data path to an output of said summing circuit for correcting amplitude and phase effects of said digital transfer function circuit.

6. A network interface circuit as set forth in claim 5 further comprising a digital filter circuit for removing high frequency signals within said extended feedback circuit.

7. A network interface circuit as set forth in claim 2 wherein said $\Sigma/\Delta$ analog-to-digital converter generates a 1-bit digital output data stream from analog form data received from said network and said $\Sigma/\Delta$ digital-to-analog converter converts a 1-bit digital input terminal into analog form.

8. A network interface circuit as set forth in claim 1 wherein said transmit data path and said receive data path carry differential signals and said first and second capacitive couplers each comprise a pair of couplers.

9. A network interface circuit as set forth in claim 2 further comprising:

a first differential driver coupled between said $\Sigma/\Delta$ analog-to-digital converter and said first capacitive coupler;

a first differential receiver coupled between said first capacitive coupler and said equipment;

a second differential driver coupled between said equipment and said second capacitive coupler; and a second differential receiver coupled between said second capacitive coupler and said $\Sigma/\Delta$ digital-to-analog converter.

10. A network interface circuit for providing voltage isolation between a network coupled to a first side of said circuit and equipment coupled to a second side of said circuit, said circuit comprising:

a receive data path for providing a path for data from said network to said equipment;

a transmit data path for providing a path for data from said equipment to said network;

a first pair of capacitive couplers in said receive data path;

a second pair of capacitive couplers in said transmit data path;

a $\Sigma/\Delta$ analog-to-digital converter on said first side of said capacitive couplers in said receive data path;

a $\Sigma/\Delta$ digital-to-analog converter on said first side of said capacitive couplers in said transmit data path;

a first differential driver in said receive data path coupled between said $\Sigma/\Delta$ analog-to-digital converter and said first capacitive coupler;

a first differential receiver coupled on said second side of said receive path capacitive couplers;

a second differential driver coupled on said second side of said transmit path capacitive couplers; and a second differential receiver coupled between said transmit path capacitive coupler and said $\Sigma/\Delta$ digital-analog converter.

11. A network interface circuit as set forth in claim 10 further comprising:

a digital transfer function circuit coupled between said first differential receiver and said transmit data path;

a digital summing circuit coupled to add an output from said digital transfer function circuit to a transmit signal from said equipment; and an extended feedback circuit coupled between an output of said digital summing circuit and said digital transfer function circuit;

wherein a gain of said digital feedback circuit is scalable to set an output impedance substantially matching a load impedance of said network.

12. A network interface circuit as set forth in claim 11 wherein said extended feedback circuit further comprises a transistor coupled between said transmit data path and said receive data path.

13. A network interface circuit as set forth in claim 12 wherein said extended feedback circuit further comprises an analog amplifier circuit coupled between said second differential receiver and said receive path wherein said transistor has a base terminal coupled to said analog amplifier and a collector terminal coupled to said receive path.

14. A network interface circuit as set forth in claim 11 wherein said extended feedback circuit comprises a digital gain adjust and filter circuit for correcting amplitude and phase effects of said digital transfer function circuit.

15. A network interface circuit as set forth in claim 14 therein said digital gain adjust and filter circuit further removes high frequency signals within said extended feedback circuit.

16. A network interface circuit as set forth in claim 10 wherein said $\Sigma/\Delta$ analog-to-digital converter generates a 1-bit digital output data stream from analog form data received from said network and said $\Sigma/\Delta$ digital-to-analog converter converts a 1-bit digital input terminal into analog form.

17. A network interface circuit for providing voltage isolation and impedance matching between a network and equipment coupled to said network through said network interface circuit comprising:

a receive data path for coupling data from said network to said equipment;

a transmit data path for coupling data from said equipment to said network;

a $\Sigma/\Delta$ analog-to-digital converter coupled to said network in said receive data path;

a first capacitive coupler coupled in said receive data path to receive data from said Σ/Δ analog-to-digital converter;

a digital transfer function circuit coupled between said first capacitive coupler and said equipment;

a digital summing circuit coupled to add an output from said digital transfer function circuit to a transmit signal from said equipment; and an extended feedback circuit coupled between an output of said digital summing circuit and said digital transfer function circuit;

wherein a gain of said digital feedback circuit is scalable to set an output impedance substantially matching a load impedance of said network.

18. A network interface circuit as set forth in claim 17 further comprising:

a first differential driver coupled between said Σ/Δ analog-to-digital converter and said first capacitive coupler;

a first differential receiver coupled between said first capacitive coupler and said digital transfer function circuit;

a second differential driver coupled between said digital summing circuit and said second capacitive coupler; and a second differential receiver coupled between said second capacitive coupler and said Σ/Δ digital-to-analog converter.

19. A method for providing voltage isolation and impedance matching between a network and equipment coupled to said network, said method comprising the steps of:

converting analog data received from said network to Σ/Δ data;

sending said Σ/Δ data received from said network across a first capacitive coupling to said equipment;

transmitting Σ/Δ data transmitted from said equipment across a second capacitive coupling;

converting data transmitted said Σ/Δ data transmitted from said equipment to analog data;

filtering and adjusting the gain of said data received from said network;

adding said filtered and gain adjusted data received from said network to said data transmitted from said equipment to form a feedback signal;

amplifying said feedback signal to set an output impedance substantially matching a load impedance of said network; and feeding back said amplified feedback signal into said data received from said network.

20. A method as set forth in claim 19 wherein said first converting step comprises performing a Σ/Δ analog-to-digital conversion on said data received from said network and said second converting step comprises performing a Σ/Δ digital-to-analog conversion on said data transmitted from said receiver.

21. A method as set forth in claim 20 wherein;

said step of converting analog data received from said network to Σ/Δ data comprises generating a 1-bit digital output data stream; and said step of converting said Σ/Δ data transmitted from said equipment comprises converting 1-bit digital data to analog form.

22. A method as set forth in claim 20 wherein said feeding back step comprises feeding back said amplified feedback signal through a transistor.

23. A method as set forth in claim 22 further comprising the step of;

providing digital gain adjustment to said feedback signal to correct any amplitude and phase effects generated in said filtering and adjusting step.

24. A method as set forth in claim 23 further comprising the step of:

digitally filtering said feedback signal to remove high frequency signals.

25. A method as set forth in claim 19 wherein said data received from said network and said data transmitted from said equipment are differentially driven across said capacitive couplings.

26. A method for providing voltage isolation and impedance matching between a network and equipment coupled to said network, said method comprising the steps of:

converting analog data received from said network to Σ/Δ data;

sending said Σ/Δ data received network across a first high voltage isolation coupling to said equipment;

transmitting Σ/Δ data transmitted from said equipment across a second high voltage isolation coupling;

converting data transmitted said Σ/Δ data transmitted from said equipment to analog data;

filtering and adjusting the gain of said data received from said network;

adding said filtered and gain adjusted data received from said network to said data transmitted from said equipment to form a feedback signal;

amplifying said feedback signal to set an output impedance substantially matching a load impedance of said network; and feeding back said amplified feedback signal into said data received from said network.

27. A method as set forth in claim 26 wherein said first converting step comprises performing a Σ/Δ analog-to-digital conversion on said data received from said network and said second converting step comprises performing a Σ/Δ digital-to-analog conversion on said data transmitted from said receiver.

28. A method as set forth in claim 27 wherein said feeding back step comprises feeding back said amplified feedback signal through a transistor.

29. A method as set forth in claim 28 further comprising the step of;

providing digital gain adjustment to said feedback signal to correct any amplitude and phase effects generated in said filtering and adjusting step.

30. A method as set forth in claim 29 further comprising the step of:

digitally filtering said feedback signal to remove high frequency signals.

31. A method as set forth in claim 26 wherein said data received from said network and said data transmitted from said equipment are differentially driven across said capacitive couplings.

* * * * *